H. B. HIGGINS, Jr.
LIQUID FUEL ATOMIZER FOR INTERNAL COMBUSTION ENGINES.
APPLICATION FILED NOV. 6, 1915.
1,244,733.
Patented Oct. 30, 1917.
2 SHEETS—SHEET 2.
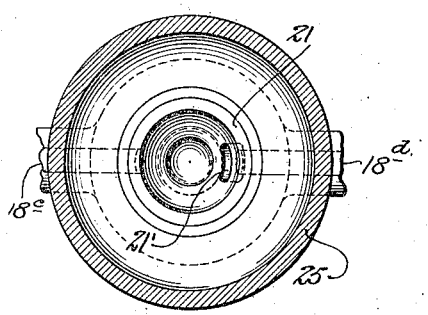
Fig. 4.
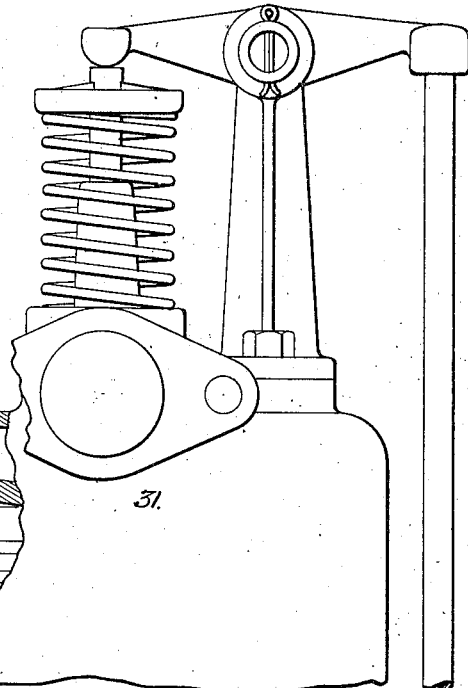
Fig. 7.
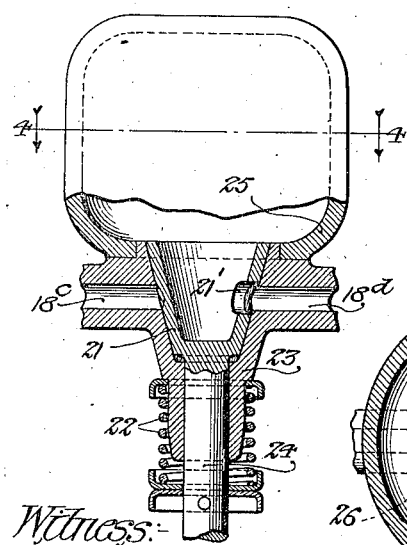
Fig. 3.
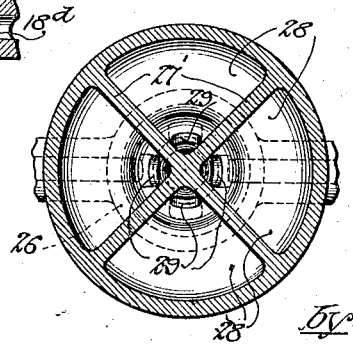
Fig. 6.
Fig. 5.
Witness:
Louis H. Whitehead
Inventor:
Henry Buckner Higgins Jr.
by [signature] Atty.

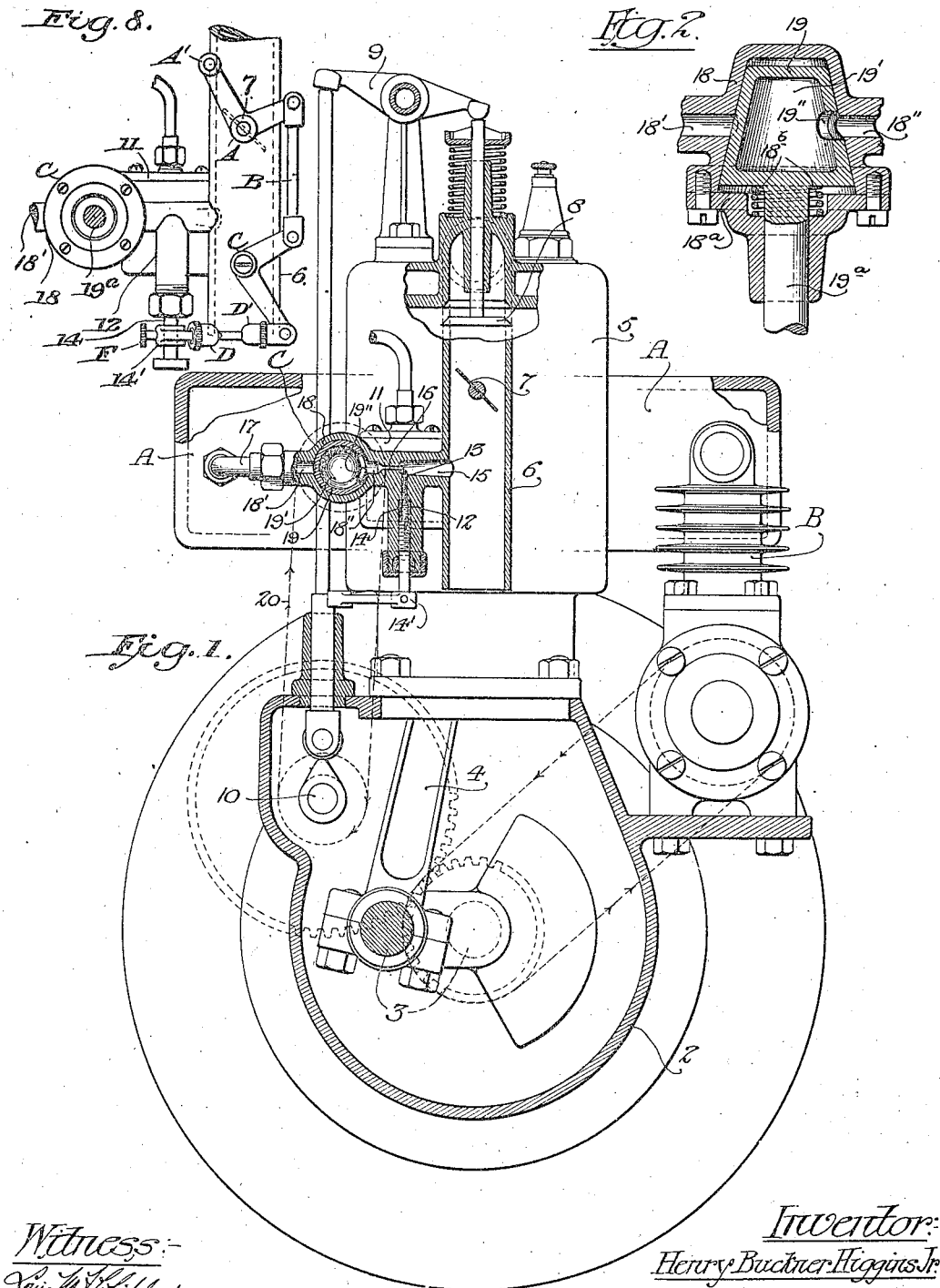

UNITED STATES PATENT OFFICE.

HENRY BUCKNER HIGGINS, JR., OF DENVER, COLORADO, ASSIGNOR TO THE CONSOLIDATED INVENTIONS COMPANY, OF DENVER, COLORADO, A CORPORATION OF COLORADO.

LIQUID-FUEL ATOMIZER FOR INTERNAL-COMBUSTION ENGINES.

1,244,733.   Specification of Letters Patent.   Patented Oct. 30, 1917.

Application filed November 6, 1915. Serial No. 60,085.

*To all whom it may concern:*

Be it known that I, HENRY BUCKNER HIGGINS, Jr., a citizen of the United States, and a resident of Denver, Denver county, Colorado, have invented certain new and useful Improvements in and for Liquid-Fuel Atomizers for Internal-Combustion Engines, of which the following is a specification.

My invention relates to internal combustion engines and has reference to improvements in the means employed for supplying fuel thereto.

The objects of my invention are, to provide a much more intimate and homogeneous mixture of fuel and air than is possible with the ordinary atmospheric carbureter;—to insure the uniform mixture of air and fuel, regardless of the fluctuating vacuum in the intake manifold of the engine;—to avoid choking or throttling the manifold and thus insure greater possible speed and power from a given motor;—and to eliminate small and delicate springs, air valves and other complications common to atmospheric carbureters and heretofore needed to break up the fuel, to regulate the supply and to compensate for the erratic action of the air flow in the manifold.

I accomplish these ends by using compressed air, at uniform pressure, and in uniform quantities, to atomize the fuel and regulate the quantity thereof supplied to the air intake of the engine depending in no way upon the vacuum in the intake manifold for the supply or the regulation of the fuel. In the case of my invention, when the throttle is fully opened there is a free passage for the combustible mixture, there being no spring loaded valves, choke tubes or the like, to hinder the free movement of either fuel, air or mixture to or in the manifold.

In carrying out my invention I prefer to employ mechanism of the kind disclosed in the accompanying drawings and hereinafter fully described, and also particularly pointed out in the appended claims.

In said drawings, Figure 1 is a diagrammatic elevation of an internal combustion engine embodying my invention;—Fig. 2 is an enlarged horizontal section of the valve of the atomizer;—Fig. 3 is a similar view of an atomizer valve of greater capacity;—Fig. 4 is a section on the line 4—4 of Fig. 3;—Fig. 5 illustrates a multiple form of the atomizer valve;—Fig. 6 is a section on the line 6—6 of Fig. 5;—Fig. 7, illustrates the application of my invention to an engine of the Deisel or other heavy oil type, and Fig. 8 illustrates the connection between the throttle valve and the needle valve.

The engine depicted in Fig. 1 is merely typical of various kinds of internal combustion engines. My invention is applicable to all types. Familiar parts of the engine will be recognized as follows: the base, 2; the crank shaft, 3; the connecting rod, 4; the cylinder, 5; the intake or admission manifold, 6; the throttle valve, 7; the intake or admission valve, 8; the valve operator, 9; and the cam shaft, 10, from which the operator is actuated. To these usual parts I add:—first, an air tank or reservoir, A, adapted to withstand considerable internal air pressure;—second, an air pump, B, preferably driven from the crank shaft, 3;—and, third, an atomizer, C, interposed between the tank, A, and the intake manifold, 6.

The liquid fuel is held at a constant level in a float chamber, 11, of familiar construction. The fuel flows therefrom through the duct, 12, and rises normally nearly to the top of a vertical nozzle, 13. A needle valve, 14, is provided for controlling the flow from duct to nozzle; and when desired this valve may be mechanically coupled to the throttle valve, 7, as by means of a connection, 14'. Fig. 8 illustrates a preferred connection between the needle-valve 14, and the throttle-valve 7. Mounted on the end of the stem of valve 7, is a bell-crank A, one end of which A' may be attached to the control lever, and the other end connected, by means of a link B, to the bell-crank C. The bell-crank C is operatively secured to the connection 14' by the link E. D and D' are ball and socket joints which permit the link E to operate freely. The connection 14' is fastened to the valve stem 14 by means of a set screw F, allowing adjustment of the valve 14, independently of the throttle-valve 7. In the side of the manifold, 6, is a relatively deep recess, or pocket, 15, preferably slightly tapered away from the manifold. The nozzle, 13, projects into the recess or atomizing space, 15, near the outer end thereof. Another nozzle, 16, enters the recess and opens across the top of the nozzle, 13. As hereinafter explained, compressed air is admitted through the nozzle, 16, and, rushing across the opening of the nozzle, 13, draws the liquid therefrom and atomizes it. In this manner the liquid fuel is minutely and forcibly atomized and discharged into the manifold, 6.

It will be understood that when the engine is in operation the pump, B, constantly compresses and stores air in the reservoir, A. A pressure-regulating valve may be used on the tank if desired, but such valve is usually a part of the air pump. From the tank I draw the compressed air required at the nozzle, 16. The important office of regulating the quantity of the liquid fuel delivered to the intake manifold is performed by the mechanism about to be described.

A passage, 17, is provided between the reservoir, A, and air nozzle, 16. Part of this passage is enlarged to form a valve casing, 18, containing a preferably tapered valve-seat, and also containing a rotary valve, 19. This part is more than a mere valve, for it not only serves to open and close the passage between the tank and the air nozzle, but also positively measures the quantity of compressed air delivered to the air nozzle in each cycle of the operation of the engine. For this purpose the valve, 19, which is tapered to fit the seat-in, 18, contains a chamber, 19', of sufficient size to hold that quantity of compressed air which is required to draw from the nozzle, 13, and atomize the exact quantity of liquid fuel required by the engine. It will be understood that the quantity of fuel may be arbitrarily controlled by adjusting the needle valve, 14, in conjunction with the throttle valve, 7, or separately; but such adjustment is negligible in the consideration of my invention. The valve, 19, contains only one port, 19". It is positively rotated in time with the crank shaft, 3, of the engine, as by means of a sprocket chain belt connection, 20, with the cam shaft, 10. In one part of its rotation the hollow valve, receives compressed air from the port, 18', connected to the tank, A, and in the opposite part of its rotation the valve presents its port, 19', to the port, 18", of the nozzle, 16. Thus the rotary valve alternately draws compressed air from the tank and discharges it into the atomizer.

The detailed construction of the atomizer valve may be modified at the pleasure of the designer of the engine with which it is to be used, but in most cases I prefer to construct it as shown in Fig. 2. As there shown, it will be seen that the casing, 18, is integral with those parts of the connection, 17, which contain the ports, 18', and 18". The large end of the casing is closed by the plate, 18ª, through which extends the shaft, 19ª, of the valve 19. The tapered valve, 19, is pressed against the tapered seat by a spring, 18ᵇ, arranged between the end of the valve of the plate, 18ª. Obviously the shaft, 19ª, is the part connected with the cam shaft, 10, by the chain belt described. During operation, the port, 19", in the hollow valve registers with the port, 18", of the air nozzle, simultaneously with each intake of air through the open manifold, 6. There is never an open passage from the reservoir, A, to the manifold, 6, hence no waste of compressed air is experienced when the motor is at rest or is running slowly. At every revolution a regulated quantity of fuel is forcibly extracted from the nozzle, 13, and is discharged into the manifold in a finely atomized condition, intimately admixed with a small measured quantity of air from the compressor. This initial or rich mixture is instantly taken up by the air moving in the manifold and thus I insure a regular and dependable supply at the admission valve or valves of the engine, and also insure the delivery of the combustible mixture to the valves in the best possible condition for use in the cylinders of the engine.

In dealing with engines of large piston displacement it is not necessary to proportionally enlarge the atomizing valve and thus entail the expenditure of more power for its operation. By this I mean that the effective capacity of the rotary valve may be otherwise enlarged. For example, the valve so far as its size is concerned may remain as before and either a rotary or a stationary capacity extension provided for coaction therewith. Such an arrangement of parts is illustrated in Figs. 3 and 4. As shown, it is best to reverse the position of the tapered valve, 21, and place its spring, 22, on the outside of the valve casing, 23. The end of the valve opposite the shaft, 24, is open, and communicates with the interior of the capacity extension, 25, on the casing, 23. The chamber or extension, 25, is preferably formed in a separate part and is fastened on the casing, 23, and tightly jointed therewith to prevent leakage. It will be clear at a glance that when the port, 21', of the valve registers with the port, 18ᶜ, of the casing, both the valve and its stationary extension, 25, will be filled with compressed air from the tank; and reversely, when the port, 21', registers with the nozzle port, 18ᵈ, substantially the whole compressed air content of the valve plus its stationary extension will be discharged through the atomizing nozzle. It is clear that a rotary valve containing a single chamber and single port, with or without an extension, may be used upon a multiple cylinder engine. But there are certain cases in which I find it desirable to apply the pulsations of compressed air very rapidly and in such cases, and chiefly to avoid operating the atomizing valve at too high a speed, I prefer to subdivide the rotary valve in the manner shown in Figs. 5 and 6. No greater number of ports are required in the valve casing, 26, but the capacity extension, 27, is integral with the body of the valve, and both the valve proper and the extension are divided by one or more partitions, 27'. In this manner a single valve is made to contain several compressed air chambers, 28, the number depending on the rotative speed of the valve. In each chamber, 28, I provide a valve port, 29. As the valve rotates in the casing, it successively presents these ports to the ports in the valve casing.

As my invention is particularly applicable to engines of the Deisel type, and others of the heavy oil type, I have shown in Fig. 7 a form of atomizer especially adapted therto. Here again the rotary valve, 30, may be of either single or multiple type, but I prefer that there shall be one such valve for each cylinder, 31, of the engine, and therefore, as a rule, the valve, 30, is of the single-chamber type. The compressed air-nozzle, 32, and the liquid fuel nozzle, 33, opens into an atomizing recess, 34, formed in a nozzle-like extension, 35, of the valve casing. This end or the nozzle, 35, is tightly fitted in the wall of the cylinder, and the recess, 34, opens into the top of the cylinder. The liquid supply chamber, 37, may be formed in the lower part of the valve casing member and in that case a check valve, 38, is provided directly in the chamber, 37, to control the supply pipe or passage, 39. The valve, 30, is rotated by any rotating part of the engine, and operates in the manner before described; the only material difference being that the air is supplied to the valve, 30, under greater pressure than required by an engine of the lower compression type before described. Following ordinary practice, the governor (not shown) of the engine changes the stroke of the pump which supplies fuel to the chamber, 37; and the governor may also regulate the pressure and therefore the quantity of the air at the intake port of the rotary valve. One great advantage of my novel injector or atomizer over the injector now in use on Deisel and the like engines, lies in its economy of high pressure air at low-engine speeds. The fuel may be pumped into the chamber, 37, during the suction or scavenging stroke of the piston. At such times the pressure in the cylinder and in the atomizing chamber is low, hence my invention admits of the use of lighter pump mechanism and packing and improves the action of the governor of the engine for the work of the latter is lightened.

Having thus described my invention, I claim as new and desire to secure by Letters Patent:

1. An attachment for an internal combustion engine, comprising a fuel nozzle, a reservoir adapted to contain an aeriform promotor of combustion under substantially constant pressure, a duct for conveying said promotor of combustion, and opening adjacent said nozzle, and means whereby unvaried quantities of said promotor of combustion, under said constant pressure, are delivered to said duct, substantially as and for the purpose described.

2. An attachment for an internal combustion engine, comprising a fuel nozzle, a reservoir adapted to contain an aeriform promotor of combustion under substantially constant pressure, a duct for conveying said promotor of combustion, and opening adjacent said nozzle, and means operable by the engine, whereby unvaried quantities of said promotor of combustion, under said constant pressure, are delivered to said duct, substantially as and for the purpose described.

3. An attachment for an internal combustion engine, comprising a fuel nozzle, a reservoir adapted to contain an aeriform promotor of combustion under substantially constant pressure, a duct for conveying said promotor of combustion, and opening adjacent said nozzle, and means whereby unvaried quantities of said promotor of combustion, under said constant pressure, are delivered to said duct, said quantities and pressure being independent of the speed of the engine, substantially as and for the purpose described.

4. The improvement herein described comprising a fuel nozzle, a compressed air duct opening adjacent thereto, and a cylinder connection for said nozzle and duct, in combination with a chambered rotary valve adapted to receive a measured quantity of compressed air, and means for rotating said valve whereby said compressed air is delivered to said duct.

5. The improvements herein described comprising an internal combustion engine, in combination with a source of fluid fuel, an aeriform fluid reservoir, a mechanism associated with the engine for maintaining a substantially constant pressure of aeriform fluid in said reservoir, a constant capacity measuring device connected with a moving part of the engine to operate in time with the piston thereof and adapted to extract at each operation a definite quantity of fluid from said reservoir, said measuring device being conjoined with said fuel source and the engine cylinder, whereby predetermined quantities of aeriform fluid and fuel are injected into said cylinder at each operation of the measuring device.

6. The improvement herein described comprising an internal combustion engine, in combination with a source of fluid fuel, an aeriform fluid container, means for maintaining aeriform fluid under pressure in said container, a constant capacity measuring device connected with a moving part of the engine to operate in time with the piston thereof, a conduit connecting said device with the cylinder of the engine and with said source of fluid fuel, said device being adapted at one period in its operation to extract a predetermined quantity of aeriform fluid from said container and at another period to discharge the extracted quantity through said connection between said device and the engine cylinder, substantially as and for the purpose described.

7. The herein described attachment for an internal combustion engine comprising a liquid fuel nozzle, a duct for the conveyance of a compressed supporter of combustion and opening adjacent said nozzle, and a cylinder connection for said nozzle and duct, in combination with a rotating feeder valve operated by a moving element of the engine, said valve being adapted, at a point in its revolution, to receive and periodically hold a measured quantity of compressed supporter of combustion, and to thereafter discharge said quantity into said duct, substantially as described.

8. The herein described attachment for an internal combustion engine comprising a liquid fuel nozzle, a compressed combustion-supporter duct opening adjacent said nozzle, a combustion supporter reservoir, means for compressing the combustion-supporter therein, and a rotating feeder valve actuated by a moving element of the engine, and adapted to alternately receive a measured quantity of said combustion-supporter from said reservoir and to discharge it into said duct, substantially as described.

In testimony whereof, I have hereunto set my hand this 2nd day of November, 1915.

HENRY BUCKNER HIGGINS, Jr.